United States Patent [19]
Van De Vijvere

[11] Patent Number: 5,769,911
[45] Date of Patent: Jun. 23, 1998

[54] DEVICE FOR THE REMOVAL OF LIQUID AND SOLID CONTAMINANTS FROM A GAS

[75] Inventor: Luc Van De Vijvere, Kontich, Belgium

[73] Assignee: Atlas Copco Airpower, n.v., Wilrijk, Belgium

[21] Appl. No.: 805,294

[22] Filed: Feb. 25, 1997

[30]     Foreign Application Priority Data

Feb. 29, 1996 [BE] Belgium ............................... 9600178

[51] Int. Cl.⁶ .................................................. B01D 19/00
[52] U.S. Cl. ............................... 55/219; 55/355; 55/432; 55/466; 96/168
[58] Field of Search ............................. 55/210, 218, 219, 55/355, 432, 433, 466; 95/24, 254; 96/158, 168

[56]                References Cited

U.S. PATENT DOCUMENTS

| | | | |
|---|---|---|---|
| 381,150 | 4/1888 | Lowden | 55/219 |
| 1,255,395 | 2/1918 | Duram | 96/158 |
| 1,448,972 | 3/1923 | Long . | |
| 2,311,697 | 2/1943 | Samiran | 55/219 |
| 3,112,190 | 11/1963 | Topol | 96/168 |
| 3,130,023 | 4/1964 | Hasselberg | 55/219 |
| 3,378,993 | 4/1968 | Veres et al. | 55/432 |
| 3,912,629 | 10/1975 | Sonoda | 55/219 |
| 4,136,009 | 1/1979 | Samiran | 55/219 |

FOREIGN PATENT DOCUMENTS

| | | |
|---|---|---|
| 0 062 014 A1 | 10/1982 | European Pat. Off. . |
| 354458 | 10/1905 | France . |
| 126963 | 9/1919 | United Kingdom . |
| 1 472 221 | 5/1977 | United Kingdom . |

*Primary Examiner*—C. Scott Bushey
*Attorney, Agent, or Firm*—Bacon & Thomas

[57]                ABSTRACT

A device for the removal of liquids and/or impurities from a gas includes a primary receiver which at an upper area thereof communicates with a space or conduit in which liquid or impurities containing gas is contained and in this primary receiver a secondary receiver that is cut off from the gas is provided, and in the space between both receivers a generally vertically extending connecting conduit is provided which at its bottom communicates with a lower area of the space between both receivers and at its upper end empties through a passage into the secondary receiver. A float controlled valve is provided in the secondary receiver which keeps an outlet normally closed, but which is openable by rising of the float under the influence of liquid in the secondary receiver to drain liquid from the secondary receiver. Impurities remain in the primary receiver from which they can be periodically removed.

9 Claims, 3 Drawing Sheets

DEVICE FOR THE REMOVAL OF LIQUID AND SOLID CONTAMINANTS FROM A GAS

BACKGROUND OF THE INVENTION

1. Field of the Invention

The present invention relates to a device for the removal of liquid and solid contaminants from a gas.

2. Related Technology

The invention is mainly applied in devices such as compressors, dry air blowers, air-conditioning systems and the like, with a view to regulating the percentage of moisture or other liquid which is present in the air.

Known devices make use of a receiver or trap that receives liquid removed from a gas, these devices being provided with a float that co-operates with a valve that opens an outlet at the bottom of the receiver when the level of the liquid reaches a certain height in the receiver in order to periodically drain the liquid and/or the impurities from the receiver.

The outlet in the receiver must have a relatively small diameter in order that the drainage of the liquid occurs slowly so that no transitional phenomena arise in the characteristics of the gas, such as alterations in pressure or volume.

A serious disadvantage of these known devices is the fact that solid impurities that are present in the liquid or gas, having a density greater than the liquid, will sink to the bottom of the receiver, where they can easily obstruct the small outlet in the receiver when the valve opens, which results in a poor operation of the device and can even render it inoperative.

BRIEF SUMMARY OF THE INVENTION

The present invention aims at eliminating the above-mentioned and other disadvantages.

To this end the device for the removal of liquids and/or solid contaminants from a gas mainly consists of a receiver that communicates at its upper end with the space or conduit in which the gas is contained and in this first or primary receiver secondary receiver, which is cut off from the gas, is provided, whereby in the space between both receivers a connecting conduit that extends generally vertically is provided which communicates at its lower end with the space between both receivers and at its upper end empties or terminates within the second receiver. A float is provided in the secondary receiver which controls a valve that opens and closes an outlet in response to liquid level in the second receiver.

An important advantage that is obtained with this device is the fact that the solid impurities having a density greater that the liquid in the gas will be collected in such a manner that the outlet for the liquid will not be obstructed by these impurities.

In a preferred embodiment of the present invention the primary receiver is provided with an opening which can be closed in order to offer the possibility of draining the above-mentioned solid impurities from the receiver.

BRIEF DESCRIPTION OF THE DRAWINGS

In order to better show the characteristics of the invention, a preferred embodiment of a device for removing liquid and/or solid impurities from a gas according to the present invention is described hereafter, as an example, and without any restrictive character whatsoever, reference being made to the accompanying drawings, in which.

DETAILED DESCRIPTION OF THE PREFERRED EMBODIMENT

Figure 1:
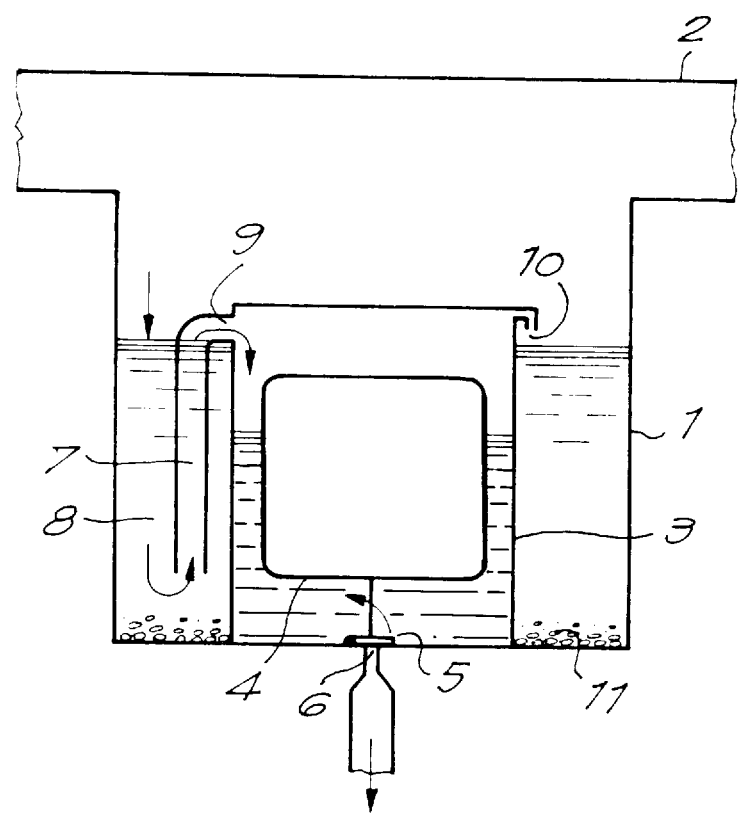
FIG. 1 represents a schematic view of a device according to the invention.

The device according to the invention mainly comprises a primary receiver 1 which communicates at its upper end with a space or a conduit 2 in which a gas is contained, from which liquid and/or impurities are to be removed.

In the primary receiver 1 a secondary receiver 3 is provided and in which is situated a float 4 that controls a valve 5 which can respectively close and open an outlet 6.

Between both receivers 1 and 3, a connecting conduit 7 is provided which communicates at its lower open end with a lower area of the space 8 between both receivers and empties or terminates at its upper end within the secondary receiver via passage 9. The conduit 7 preferably is generally vertically oriented in the primary receiver.

At its upper end the secondary receiver 3 is isolated from the space or conduit 2, possibly with the exception of a small ventilating opening 10 which is positioned at a level which is higher than the passage 9 and which, in this embodiment, is directed downwardly.

The operation of the device is simple and is as follows:

In a starting situation it is assumed that the receivers 1 and 3 do not contain liquid.

Moisture in the gas will be caught in the primary receiver 1 on account of its higher weight relative to the gas.

The level of liquid in the space 8 and in the connecting conduit 7 will eventually rise.

At the same time solid impurities 11 which are contained in the gas will also arrive in the primary receiver 1 and they will sink to the bottom of the receiver 1 on account of their weight.

The valve 5 will remain in its normally closed position on account of the weight of the float 4.

Once the level of the liquid in the space 8 and in the connecting conduit 7 has reached the height of the passage 9, new quantities of liquid which arrive in the primary receiver 1 will cause the column of liquid in the space 8 to rise, as a result of which the level of the liquid in the connecting conduit 7 also will tend to rise but since it cannot do so, an overflow occurs of the same quantity of liquid arriving in the primary receiver 1, through the passage 9, into the secondary receiver 3, and a corresponding quantity of gas escapes from the secondary receiver 3 through the ventilating opening 10.

When the level of the liquid in the secondary receiver 3 has reached a predetermined height, the downward pressure exerted by the weight of the float 4 is equal to the upward pressure exerted by the liquid column in the receiver 3 on the float 4.

When the level of the liquid in the secondary receiver 3 further rises the float 4 will move upwards to cause the valve 5 to slowly open.

Liquid will now drain through the small drainage opening 6 from the secondary receiver 3, so that the level of the liquid and at the same time the float 4 in the secondary receiver 3 will drop until the float 4 automatically closes the valve 5 again.

Further quantities of liquid from the gas which are caught by the primary receiver 1 will cause a drainage of an equal quantity of liquid from the drainage opening 6.

Impurities 11 from the gas will not be entrained upwardly with the liquid in the connecting conduit 7 on account of their weight. As a result, the content of the secondary receiver will always remain free from impurities, whereby obstructions of the outlet 6 are avoided.

Figure 2:
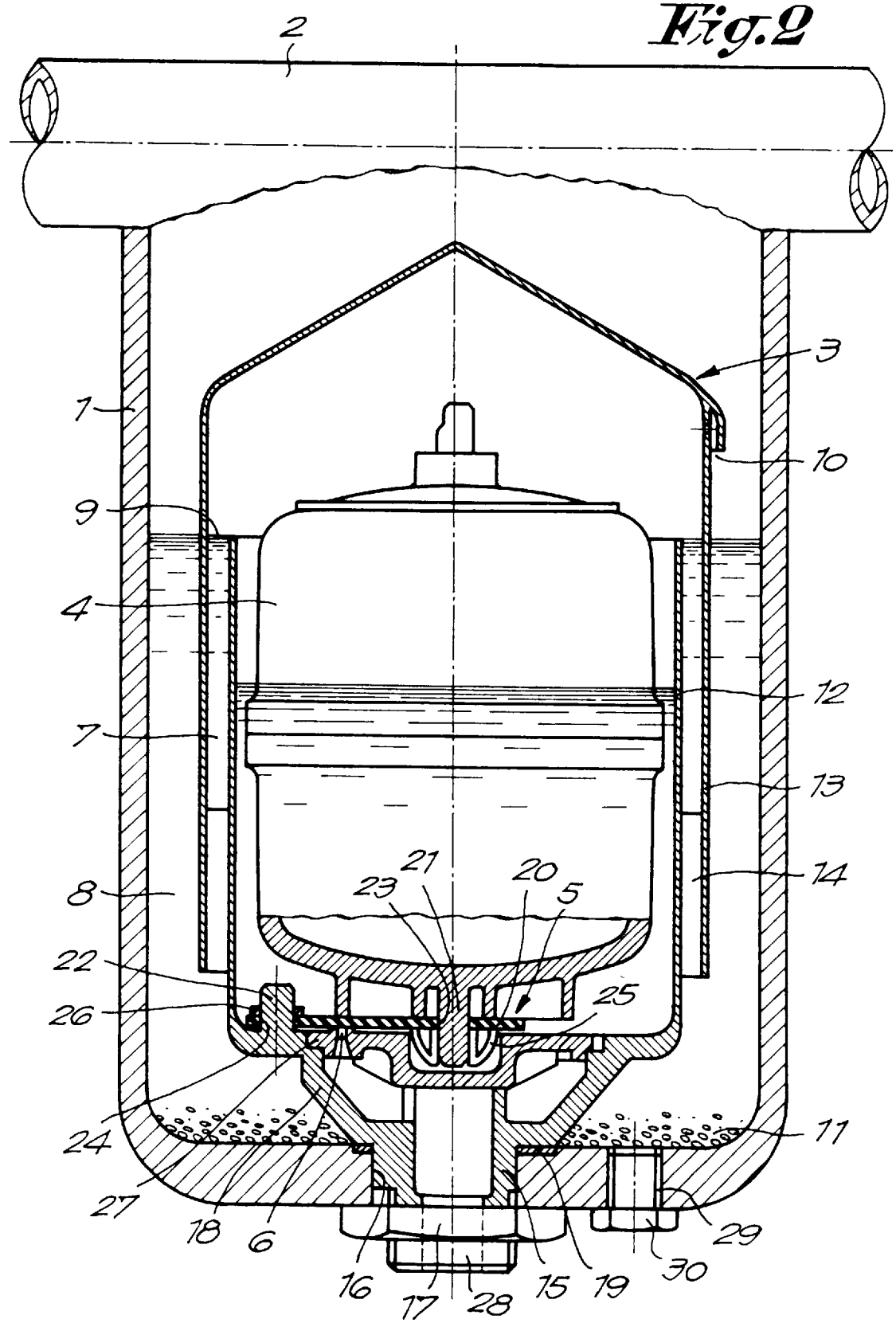
FIG. 2 represents a cross-sectional view of a preferred embodiment of the device of the invention.
Figure 3:
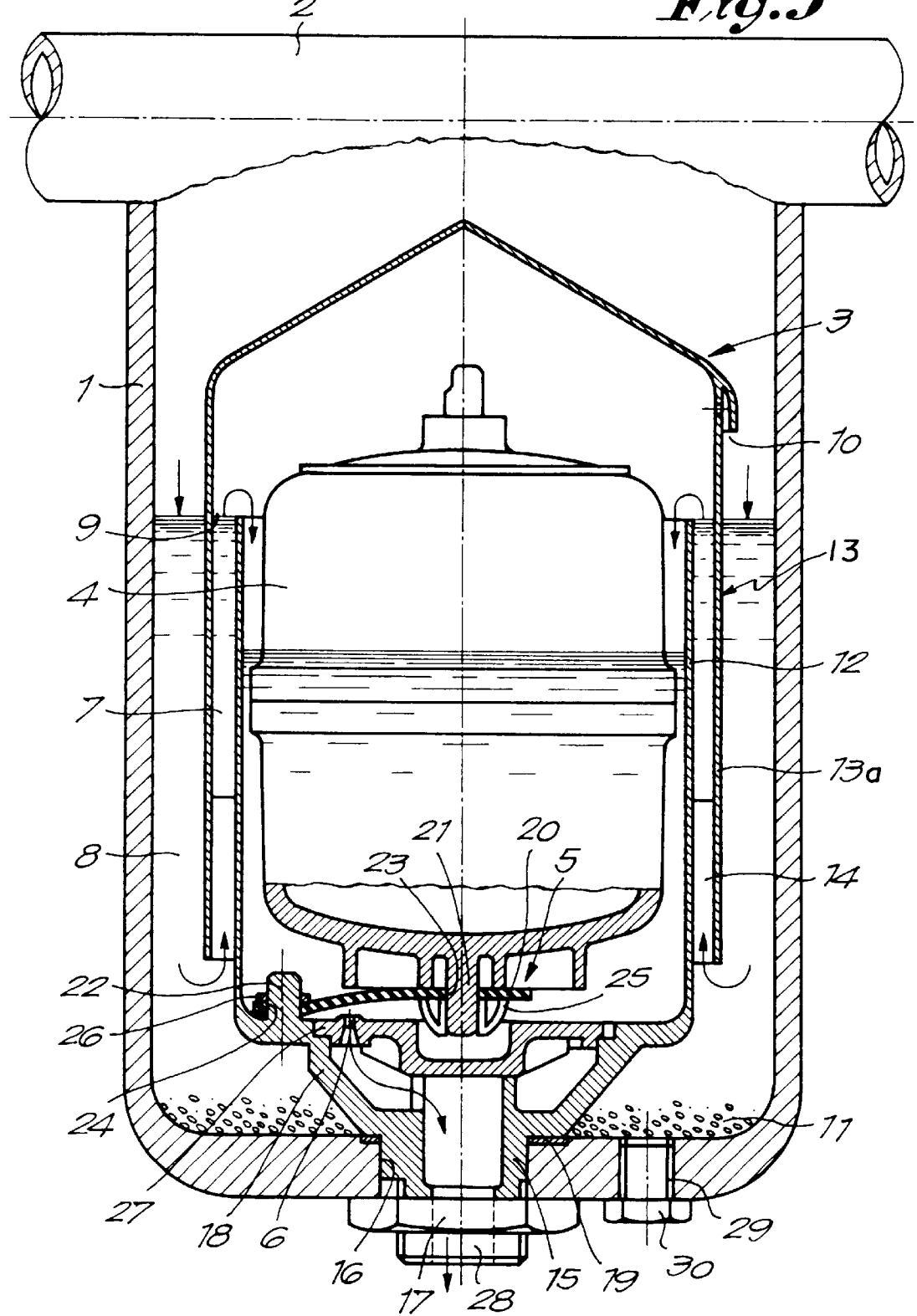
FIG. 3 represents a sectional view similar to the one of FIG. 2, but with another position of the float.

In a preferred embodiment of the device, such as represented in FIGS. 2 and 3, the secondary receiver 3 is located within primary receiver 1 and is formed as a tubular receptacle 12 over which is placed a closed dome 13 which overlies the open upper end of receptacle 12 and includes a skirt portion 13a that extends downwardly along the outer wall of receptacle 12 but spaced therefrom. Dome 13, in particular skirt 13a, is secured at a certain distance relative to the outer wall of tubular receptacle 12 by means of spacers 14.

These spacers 14 could possibly extend as far as against or almost against the inner wall of the primary receiver 1 in such a manner that partitions are formed which counteract possible turbulence in the column of the liquid between the primary and secondary receivers.

The connecting conduit 7 is formed by the space between the receptacle 12 and the dome 13.

The receptacle 12 at its bottom end narrows downwardly to a throat 15 which protrudes through an opening 16 at the bottom of the primary receptacle 1 and which is fixed to the primary receptacle 1 by means of a nut fastener 17.

A sealing ring 19 is applied between the collar 18 of the receptacle 12 and the opening 16 in the primary receiver 1.

The valve is preferably formed by an elastic flapper member 20 which is fixed to a protrusion 21 of the float 4, on the one hand, and to a protrusion 22 in the secondary receiver 3, on the other hand.

To this end, the flapper member 20 is, for example, provided with openings 23–24 which enable it to be secured over the protrusions 21–22 and to be retained there by means of securing rings or clamps 25–26.

The valve seat 27 which is fixedly attached in the collar 18 of the housing 12 is provided with a small opening which forms the outlet 6 of the device. This outlet 6 empties downstream in the outlet conduit 28 which extends outside the device.

The dome 13 at its upper end is closed, with the exception of a downwardly directed small ventilating opening 10 which is situated at a height which is higher than the top 9 of conduit 7. The ventilating opening 10 is directed downwardly in order to prevent impurities from the gas entering this secondary opening into the secondary receiver 3.

By regularly opening the tap 30 at the opening 29, impurities 11 on the bottom of the primary receiver 1 can be drained in order to prevent their accumulation in the primary receiver 1 to the extent that they would enter through the connecting conduit 7 into the secondary receiver 3, causing obstruction of the outlet 6.

The device is very effective and simple in operation and maintenance.

The present invention is in no way limited to the embodiment described above and represented in the drawings, but such device for the separation of liquid and/or impurities from gas can be realized in different variants, without departing from the scope of the invention.

I claim:

1. A device for removing contaminants including liquid and solid materials from air, comprising:

an air containing device;

a primary receiver having an upper and lower end, with the upper end in liquid flow communication with the air containing device;

a secondary receiver disposed within the primary receiver, and substantially isolated from the air container device; said secondary receiver having upper and lower ends;

a generally vertically extending conduit extending from a lower end area of the primary receiver to an upper end area of the secondary receiver;

a controllable, normally closed valve in the lower end of the secondary receiver for discharging a liquid contained in the secondary receiver;

a float device suspended in the secondary receiver and operably connected to the controllable valve for opening and closing the valve in response to the level of a liquid contained in the secondary receiver.

2. The device according to claim 1, wherein said primary receiver is a chamber and said secondary receiver is a receptacle having an outer wall and an open upper end area that disposed in the chamber; and a closed dome cover extending over the upper end area of the receptacle and having a skirt portion extending downwardly along the outer wall of the receptacle, said dome cover disposed in spaced relationship with said receptacle upper end area and outer wall.

3. The device according to claim 2, wherein said skirt extends to a lower end area of the primary receiver and said conduit comprises at least a portion of the space between the receptacle outer wall and the dome cover.

4. The device according to claim 2, said valve comprising an elastic flapper member fixed at one portion thereof to the float and at another portion thereof to the receptacle.

5. The device according to claim 4, said flapper device including openings at said portions thereof; said float and receptacle including protrusions over which the openings are disposed; and clamping rings securing the flapper member to the protrusions.

6. The device according to claim 1, wherein said secondary receiver includes a downwardly directed gas vent opening located at an upper end area thereof above the entry level of said conduit into the secondary receiver.

7. The device according to claim 2, wherein said primary receptacle includes a sediment tap at its lower end for removing sediment from the primary receptacle.

8. The device according to claim 2, including spacer devices between the dome skirt portion and the outer wall of the receptacle.

9. The device according to claim 8, wherein said spacer devices extend substantially to the inner wall of the chamber.

* * * * *